US009769523B2

(12) United States Patent
Yeh

(10) Patent No.: US 9,769,523 B2
(45) Date of Patent: *Sep. 19, 2017

(54) VIDEO EFFICACY MEASUREMENT

(71) Applicant: MobiTV, Inc., Emeryville, CA (US)

(72) Inventor: James Yeh, Berkeley, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/454,535

(22) Filed: Aug. 7, 2014

(65) Prior Publication Data

US 2014/0344842 A1 Nov. 20, 2014

Related U.S. Application Data

(63) Continuation of application No. 13/674,430, filed on Nov. 12, 2012, now Pat. No. 8,832,721.

(51) Int. Cl.
*H04H 60/33* (2008.01)
*H04N 21/442* (2011.01)
*H04N 7/00* (2011.01)
*H04N 21/25* (2011.01)
*H04N 21/414* (2011.01)
*H04N 21/45* (2011.01)
*H04N 21/81* (2011.01)
*H04L 29/08* (2006.01)

(52) U.S. Cl.
CPC ...... *H04N 21/44218* (2013.01); *H04H 60/33* (2013.01); *H04N 7/002* (2013.01); *H04N 21/251* (2013.01); *H04N 21/41407* (2013.01); *H04N 21/4524* (2013.01); *H04N 21/812* (2013.01); *H04L 29/08675* (2013.01); *H04L 67/22* (2013.01)

(58) Field of Classification Search
CPC .................................. H04N 21/44218
USPC ..................................... 725/12, 10
See application file for complete search history.

(56) References Cited

U.S. PATENT DOCUMENTS

| 3,541,541 | A * | 11/1970 | Engelbart | G06F 3/03543 178/18.01 |
|---|---|---|---|---|
| 5,861,881 | A * | 1/1999 | Freeman et al. | 715/201 |
| 7,526,362 | B2 * | 4/2009 | Kim | G08C 23/04 318/567 |
| 7,712,125 | B2 * | 5/2010 | Herigstad | H04N 7/163 725/109 |

(Continued)

OTHER PUBLICATIONS

"U.S. Appl. No. 13/674,430, Final Office Action mailed Apr. 4, 2014".

(Continued)

*Primary Examiner* — Michael B Pierorazio
(74) *Attorney, Agent, or Firm* — Kwan & Olynick LLP

(57) ABSTRACT

Techniques and mechanisms are described herein for facilitating the detection of user responses to media content. According to various embodiments, movement data associated with a presentation of a media content item may be received from a client device. The received movement data may then be compared with movement calibration information to create media content response data that indicates a user response to the media content item. The movement calibration information may correlate movement data with user responses to the presented media content item.

20 Claims, 6 Drawing Sheets

(56) References Cited

U.S. PATENT DOCUMENTS

| | | | | |
|---|---|---|---|---|
| 8,830,067 | B2* | 9/2014 | Igaki | G08C 17/02 340/309.16 |
| 8,832,721 | B2 | 9/2014 | Yeh | |
| 8,893,164 | B1* | 11/2014 | Teller | H04N 21/4524 725/12 |
| 2002/0085843 | A1* | 7/2002 | Mann | E03C 1/057 396/374 |
| 2006/0064733 | A1* | 3/2006 | Norton et al. | 725/135 |
| 2006/0256133 | A1* | 11/2006 | Rosenberg | G06Q 30/02 345/619 |
| 2007/0124775 | A1* | 5/2007 | DaCosta | H04N 7/17318 725/62 |
| 2008/0098448 | A1 | 4/2008 | Mondesir et al. | |
| 2009/0067847 | A1* | 3/2009 | Nakamura | G08C 23/04 398/128 |
| 2010/0020752 | A1* | 1/2010 | Anschutz et al. | 370/328 |
| 2010/0088735 | A1* | 4/2010 | Sadja et al. | 725/109 |
| 2010/0192173 | A1* | 7/2010 | Mizuki | A63F 13/12 725/25 |
| 2011/0072448 | A1* | 3/2011 | Stiers et al. | 725/10 |
| 2011/0239266 | A1* | 9/2011 | Brooks | 725/146 |
| 2012/0075168 | A1* | 3/2012 | Osterhout | G02B 27/017 345/8 |
| 2012/0093481 | A1* | 4/2012 | McDowell et al. | 386/241 |
| 2012/0222057 | A1* | 8/2012 | Sadowsky et al. | 725/10 |
| 2012/0222058 | A1* | 8/2012 | el Kaliouby et al. | 725/10 |
| 2012/0324491 | A1* | 12/2012 | Bathiche et al. | 725/10 |
| 2012/0324492 | A1* | 12/2012 | Treadwell et al. | 725/10 |
| 2012/0324493 | A1* | 12/2012 | Holmdahl et al. | 725/12 |
| 2012/0324494 | A1* | 12/2012 | Burger et al. | 725/12 |
| 2013/0097643 | A1* | 4/2013 | Stone et al. | 725/61 |
| 2014/0137142 | A1 | 5/2014 | Yeh | |
| 2015/0052555 | A1* | 2/2015 | Lian | G08C 23/04 725/37 |

OTHER PUBLICATIONS

"U.S. Appl. No. 13/674,430, Non Final Office Action mailed Jun. 4, 2013".

"U.S. Appl. No. 13/674,430, Notice of Allowance mailed Jun. 17, 2014".

"Tegra Android Accelermeter Whitepaper", 2010 NVIDIA Corporation, Retrieved from Internet <http://developer.download.nvidia.com/tegra/docs/tegra_android_accelerometer_v5f.pdf>, 2010, 12 pgs.

Stevens, Catherin et al., "Methods for Measuring Audience Reactions", Proceedings of ICoMCS Dec. 2007, Retrieved from Internet <http://marcs.uws.edu.au/links/ICoMusic/Full_Paper_PDF/Stevens_Glass_Schubert_Chen_Winksel.pdf>, Dec. 2007, 4 pgs.

* cited by examiner

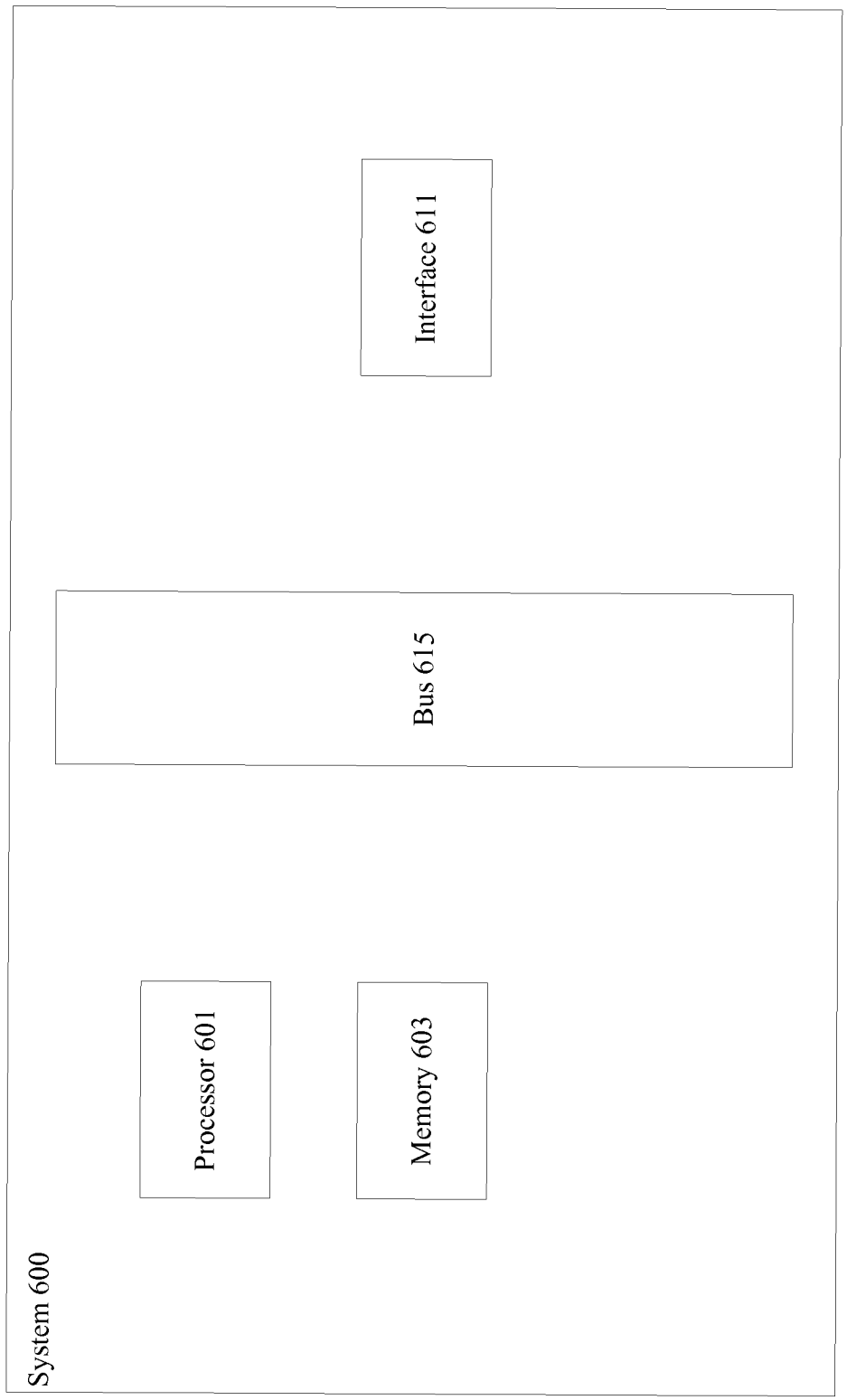

VIDEO EFFICACY MEASUREMENT

CROSS-REFERENCE TO RELATED APPLICATIONS

This application is a continuation of and claims priority to U.S. patent application Ser. No. 13/674,430 by James Yeh, filed Nov. 12, 2012, which is incorporated herein by reference in its entirety and for all purposes.

TECHNICAL FIELD

The present disclosure relates to the indirect measurement of viewer impressions of video content.

DESCRIPTION OF RELATED ART

The quality of video advertising and video content delivery may be improved by evaluating viewer reactions to content. For example, video advertising and video content are often shown to viewers in focus groups to gauge viewer reactions. In this way, advertisers and content providers can determine the efficacy of the content presented. However, focus groups constitute a relatively limited content audience. Further, the presentation of content to focus groups is typically conducted in a relatively artificial environment that differs significantly from the environments in which viewers tend to view content. Some techniques allow for measuring viewer impressions of video content even outside of such artificial environments. For instance, a microphone may be activated to detect the amount of laughter that occurs in response to a comedy program.

BRIEF DESCRIPTION OF THE DRAWINGS

The disclosure may best be understood by reference to the following description taken in conjunction with the accompanying drawings, which illustrate particular embodiments.

FIG. 6 illustrates one example of a system.

DESCRIPTION OF EXAMPLE EMBODIMENTS

Figure 1:
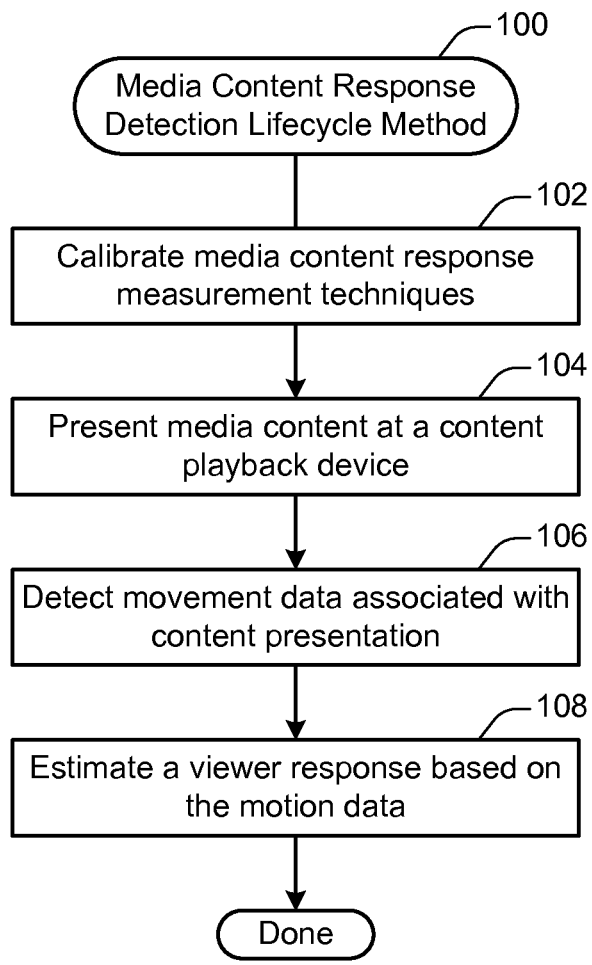
FIG. 1 illustrates one example of a method for conducting a media content response detection lifecycle.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein may facilitate the collection of information for estimating or measuring the efficacy of video content. In many cases, the techniques employed may be considered non-intrusive by users. For instance, accelerometer, orientation, motion, or location data may be collected from a user's mobile phone or other mobile computer. The system may be calibrated to identify user impressions that may be inferred from the analysis of such data. Then, data collected may be compared to the calibration data to estimate or measure the efficacy of or the reactions to video advertising or other video content.

Example Embodiments

Content providers such as advertisers and television networks would like to collect information about viewer reactions in order to understand the impact of media content. In some cases, content providers may be able to determine various types of information about viewer reactions via conventional measurement techniques. For instance, content providers may detect that viewers tended to turn off the television or change the channel when a particular media content item is presented. However, it is anticipated that content providers would like to receive more extensive and detailed information about viewer reactions. Such information may allow the content providers to better measure the efficacy of media content.

Many techniques that would be useful for identifying viewer responses to video content may be considered intrusive or unacceptable by many viewers. For example, a microphone at a user's computer or mobile phone may be activated to record reactions such as laughter, groans, exclamations, or other auditory responses. As another example, a camera at a user's computer or mobile phone may be activated to record reactions such as facial expressions or whether a viewer walks away from a media playback device presenting a media content item. However, many users would be uncomfortable allowing themselves to be filmed or recorded while viewing content.

According to various embodiments, techniques and mechanisms described herein may be used to facilitate the measurement or estimation of user responses to media content via less intrusive means. In particular embodiments, motion information may be collected from a client machine in the possession of a viewer of media content. For example, it is anticipated that many users may be more comfortable with allowing access to data received from an accelerometer or other sensor associated with a mobile phone. As another example, data regarding wireless connection signal strength, device orientation, device location, or other such information may be transmitted to a remote server. This information may be analyzed to capture user responses.

According to various embodiments, motion information may be collected and analyzed to identify viewer actions in response to the presentation of media content. For example, if the motion information indicates that a viewer walked away during the presentation of a movie or advertisement on a television screen, then the media system may infer that the viewer was likely less interested in the movie or advertisement than would be the case if the viewer remained near the televisions screen.

According to various embodiments, movement information may be collected and analyzed to infer or estimate viewer impressions in response to the presentation of media content. For instance, a viewer may be expected to laugh after the occurrence of a punch line in an advertisement or television program intended to be funny. Laughter may often be associated with movement such as shaking or knee slapping, which may be detectable by via an accelerometer or other sensor in a mobile phone located in the viewer's pocket. In this situation, if movement such as shaking is detected, then the media system may infer that the viewer laughed in response to the punch line, thus indicating that the viewer found the content funny. In contrast, the absence of such movement may indicate that the viewer did not laugh or did not find the content funny.

According to various embodiments, techniques described herein may allow content providers to determine the efficacy of media content. For example, measuring and aggregating reactions such as laughter exhibited in response to advertising or television programs intended to be funny may allow content providers to determine the extent to which the content was found humorous by users. For instance, viewer reactions to one episode of a television program may be compared to viewer reactions to another episode of a television program.

According to various embodiments, techniques and mechanisms described herein may facilitate the estimation of viewer responses to various types of media content. For example, the media content may be content selected by the viewer or may be advertising content. As another example, the media content may be content transmitted via a broadcast network such as a cable or satellite television network or may be content transmitted via an on-demand video service such as Netflix or iTunes. As yet another example, the media content may be video content such as television or movies or may be audio content such as songs or audio books.

FIG. 1 illustrates one example of a method 100 for conducting a media content response detection lifecycle. According to various embodiments, the method 100 may be performed at a media system in communication with potentially many different computing devices and content playback devices. The method 100 may be used to calibrate the media content response detection techniques. After the media content response detection is calibrated, the calibration information may be compared with movement data to estimate viewer responses to media content such as advertising, television programs, and movies.

At 102, media content response measurement techniques are calibrated. According to various embodiments, the calibration of media content response measurement techniques may involve detecting movement data associated with the presentation of content. At the same time, viewer responses or impressions may be measured or estimated more directly via techniques typically considered more intrusive. For instance, media content may be presented on a television to a viewer who has a mobile phone in his or her pocket. Then, movement data associated with the viewer's mobile phone may be collected at the same time a camera is used to measure the viewer's reaction to the media content.

In particular embodiments, the calibration of media content response measurement techniques may be based at least in part on an estimated or expected user action during a given time period. For example, at a commercial break during a television broadcast, many users might be expected to stand up and move away from the television. Accordingly, movement data collected from mobile devices during such a time period may be aggregated and analyzed to determine information such as how many users moved away from the television during a commercial break. In this case, the calibration information may include the expected action rather than, or in addition to, the correlation of previously collected movement data with viewer responses or impressions.

At 104, media content is presented at a content playback device. According to various embodiments, the media content may be any type of video and/or audio content that is capable of being presented on a content playback device. The media content may include, but is not limited to: songs, movies, television programs, audio books, or radio broadcast. The media content may be received from content sources that may include, but are not limited to: broadcast networks such as cable or satellite television networks, video on demand service providers such as Netflix or iTunes, or local or network media storage locations.

According to various embodiments, the content playback device may be associated with a content management account. A content management account may provide a vehicle for associating viewer preferences, payment, and viewing history for interacting with a media system. The media system may be used to view, access, and manage various types of content. In particular embodiments, the content may be viewed on any of a variety of content playback devices, such as computers, mobile phones, and televisions. In some cases, these devices may be associated with the content management account. For instance, a user may own a mobile phone that has installed an application for accessing content via the media system.

At 106, movement data associated with content presentation is detected. According to various embodiments, the movement data may be detected at a mobile computing device such as a smart phone in the possession of a viewer of the media content. The mobile computing device may be linked with the content management account through a content management application so that a server at the media system may receive information collected at the mobile computing device even when the person possessing the mobile computing device is not actively using the content management application. In this way, the mobile computing device may collect various types of information through one or more sensors available on the mobile computing device.

According to various embodiments, the movement data may include any motion-related data capable of being collected or inferred at the mobile computing device or another client machine in communication with the mobile computing device. For example, the signal strength of a wireless connection between two devices may provide evidence that the two devices are moving closer together or farther apart. As another example, data from one or more motion sensors, accelerometers, cameras, microphones, or orientation sensors at a mobile computing device may provide evidence of various types of motion by a person who has possession of the mobile computing device. For instance, the mobile computing device may be a mobile phone in the person's pocket, a tablet computer in the person's hands, or a laptop computer on the person's lap.

At 108, a viewer response is estimated based on the movement data. According to various embodiments, the viewer response may be estimated by analyzing the movement data detected at operation 106 based on the calibration performed at operation 102. The estimated viewer response may include any action, impression, opinion, or reaction performed or expressed during or after the presentation of the media content. For example, the estimated viewer response may include laughter, sadness, or movement toward or away from the content presentation device.

Figure 2:
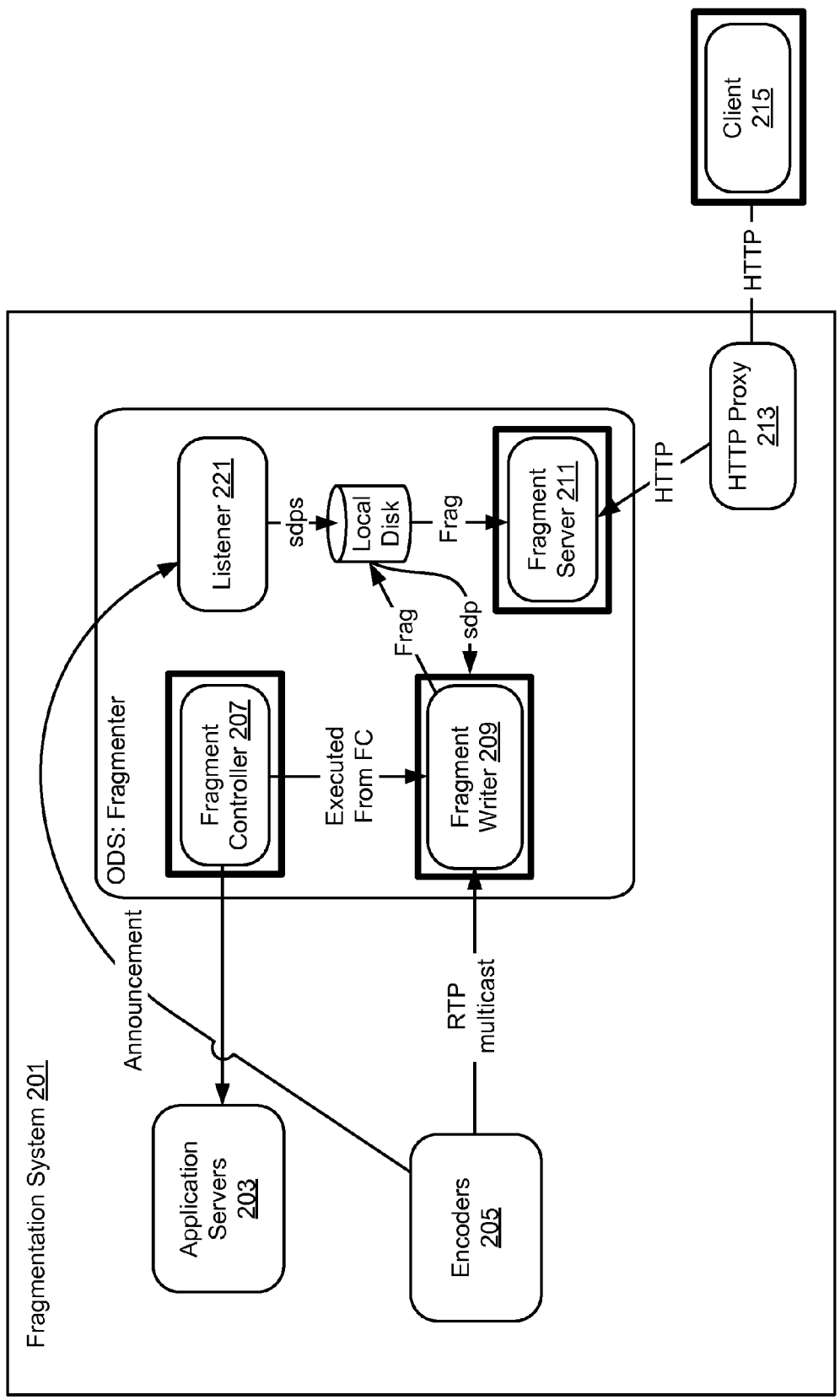
FIG. 2 illustrates one example of a system that can be used with various techniques and mechanisms of the present invention.

FIG. 2 is a diagrammatic representation illustrating one example of a fragment or segment system 201 associated with a content server that may be used in a broadcast and unicast distribution network. Encoders 205 receive media data from satellite, content libraries, and other content sources and sends RTP multicast data to fragment writer 209. The encoders 205 also send session announcement protocol (SAP) announcements to SAP listener 221. According to various embodiments, the fragment writer 209 creates fragments for live streaming, and writes files to disk for recording. The fragment writer 209 receives RTP multicast streams from the encoders 205 and parses the streams to repackage the audio/video data as part of fragmented MPEG-2 files. When a new program starts, the fragment writer 209 creates a new MPEG-2 file on fragment storage and appends fragments. In particular embodiments, the fragment writer 209 supports live and/or DVR configurations.

The fragment server 211 provides the caching layer with fragments for clients. The design philosophy behind the client/server application programming interface (API) minimizes round trips and reduces complexity as much as possible when it comes to delivery of the media data to the client 215. The fragment server 211 provides live streams and/or DVR configurations.

The fragment controller 207 is connected to application servers 203 and controls the fragmentation of live channel streams. The fragmentation controller 207 optionally integrates guide data to drive the recordings for a global/network DVR. In particular embodiments, the fragment controller 207 embeds logic around the recording to simplify the fragment writer 209 component. According to various embodiments, the fragment controller 207 will run on the same host as the fragment writer 209. In particular embodiments, the fragment controller 207 instantiates instances of the fragment writer 209 and manages high availability.

According to various embodiments, the client 215 uses a media component that requests fragmented MPEG-2 files, allows trick-play, and manages bandwidth adaptation. The client communicates with the application services associated with HTTP proxy 213 to get guides and present the user with the recorded content available.

Figure 3:
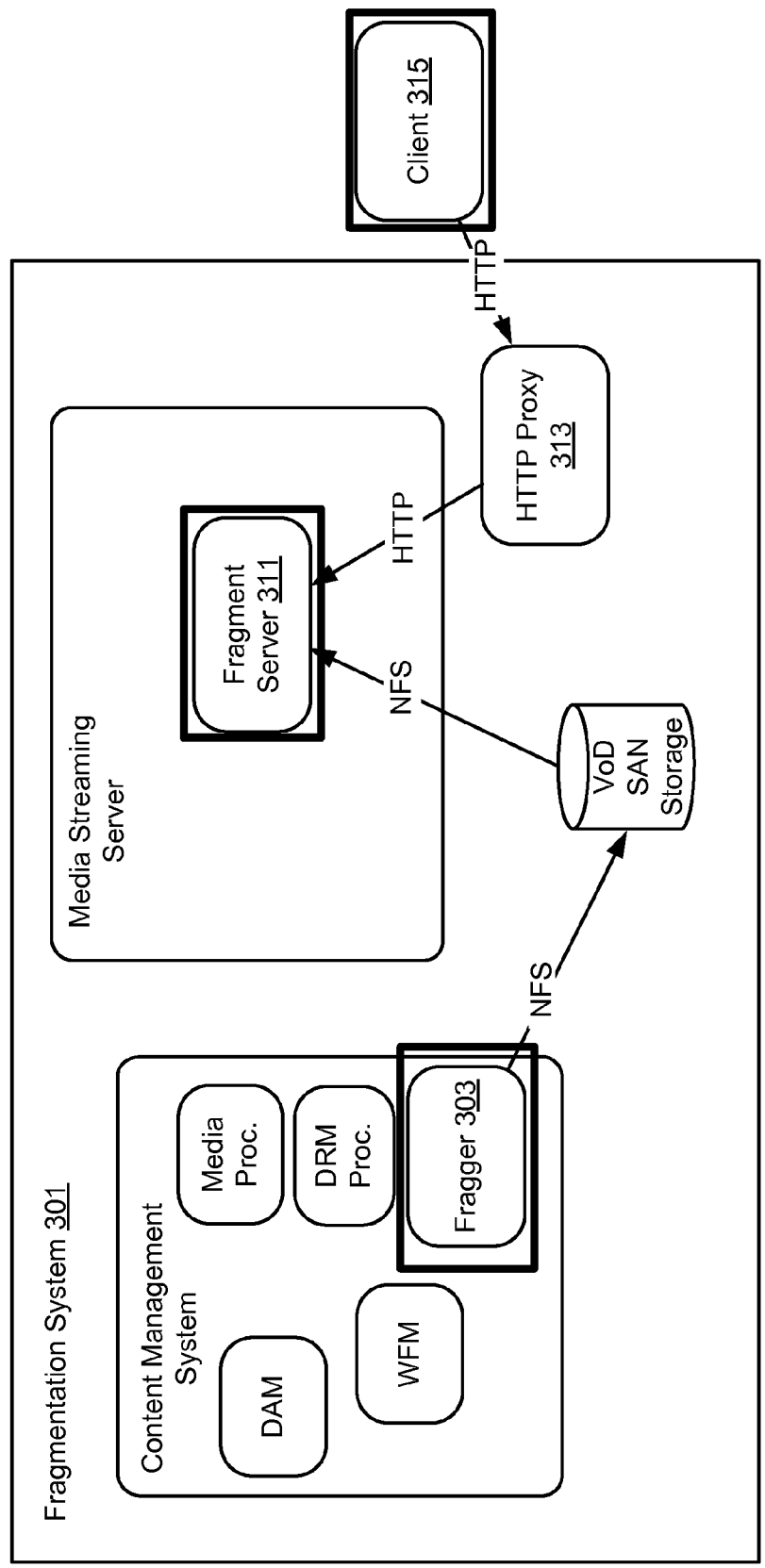
FIG. 3 illustrates another example of a media delivery system.

FIG. 3 illustrates one example of a fragmentation system 301 that can be used for video-on-demand (VoD) content. Fragger 303 takes an encoded video clip source. However, the commercial encoder does not create an output file with minimal object oriented framework (MOOF) headers and instead embeds all content headers in the movie file (MOOV). The fragger reads the input file and creates an alternate output that has been fragmented with MOOF headers, and extended with custom headers that optimize the experience and act as hints to servers.

The fragment server 311 provides the caching layer with fragments for clients. The design philosophy behind the client/server API minimizes round trips and reduces complexity as much as possible when it comes to delivery of the media data to the client 313. The fragment server 311 provides VoD content.

According to various embodiments, the client 313 uses a media component that requests fragmented MPEG-4 files, allows trick-play, and manages bandwidth adaptation. The client communicates with the application services associated with HTTP proxy 313 to get guides and present the user with the recorded content available.

Figure 4:
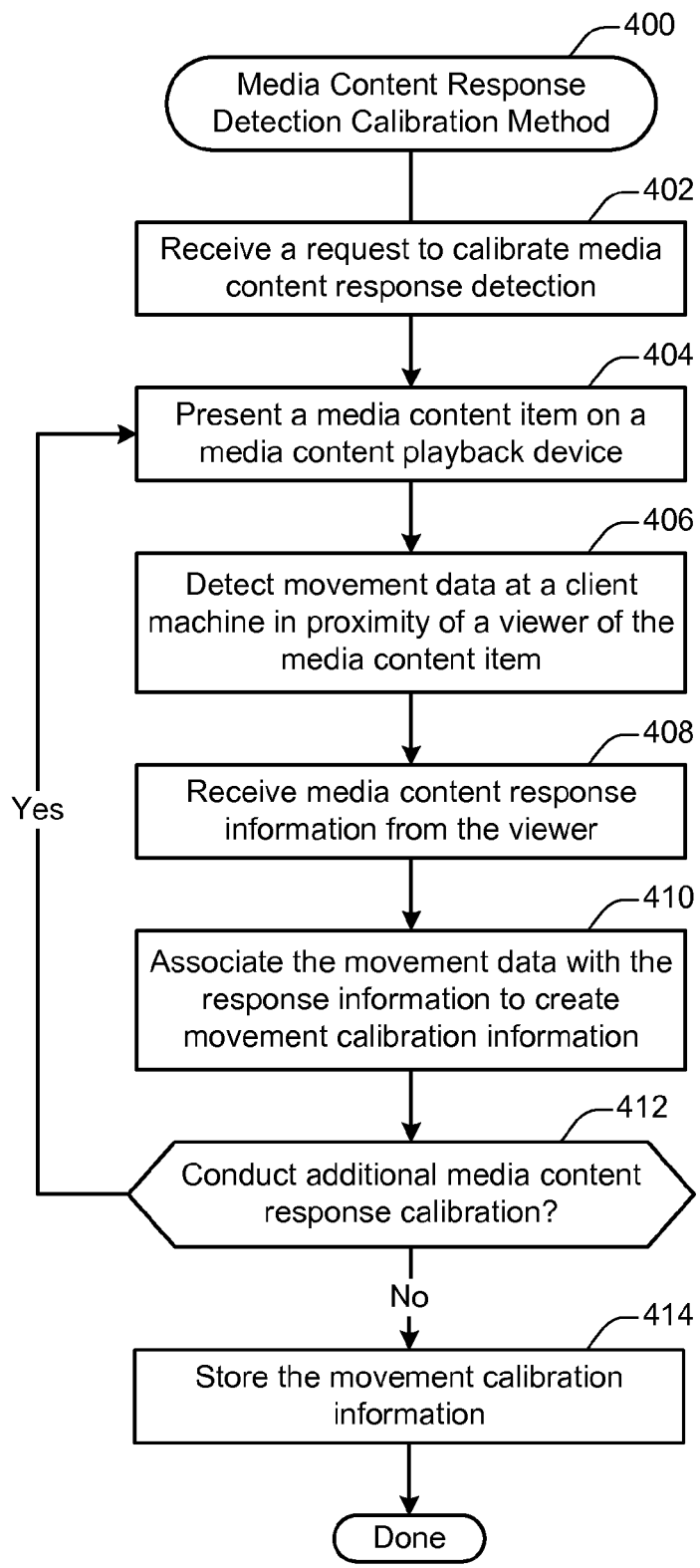
FIG. 4 illustrates one example of a method for calibrating media content response detection techniques.

FIG. 4 illustrates one example of a method 400 for calibrating media content response detection techniques. According to various embodiments, the method 400 may be performed at a media system in communication with potentially many different client machines and content playback devices. The method 400 may be used to associate various types of movement data with viewer reactions to content for the purpose of calibrating the viewer response detection techniques. For instance, movement data may be received from an accelerometer at a mobile phone, and the movement data may indicate that the mobile phone is being shaken in a particular way. In this case, a camera or other intrusive technique may be used to determine the viewer's actual response to the media content presented at this time. Then, in the future, the viewer's response may be inferred based on similar movement data without requiring the use of the intrusive response detection techniques.

At 402, a request to calibrate media content response detection is received. According to various embodiments, the request may be received in the context of a media content response detection lifecycle method, as discussed with respect to FIG. 1. The request may be generated automatically based on a triggering event, may be generated periodically, or may be generated manually.

Figure 5:
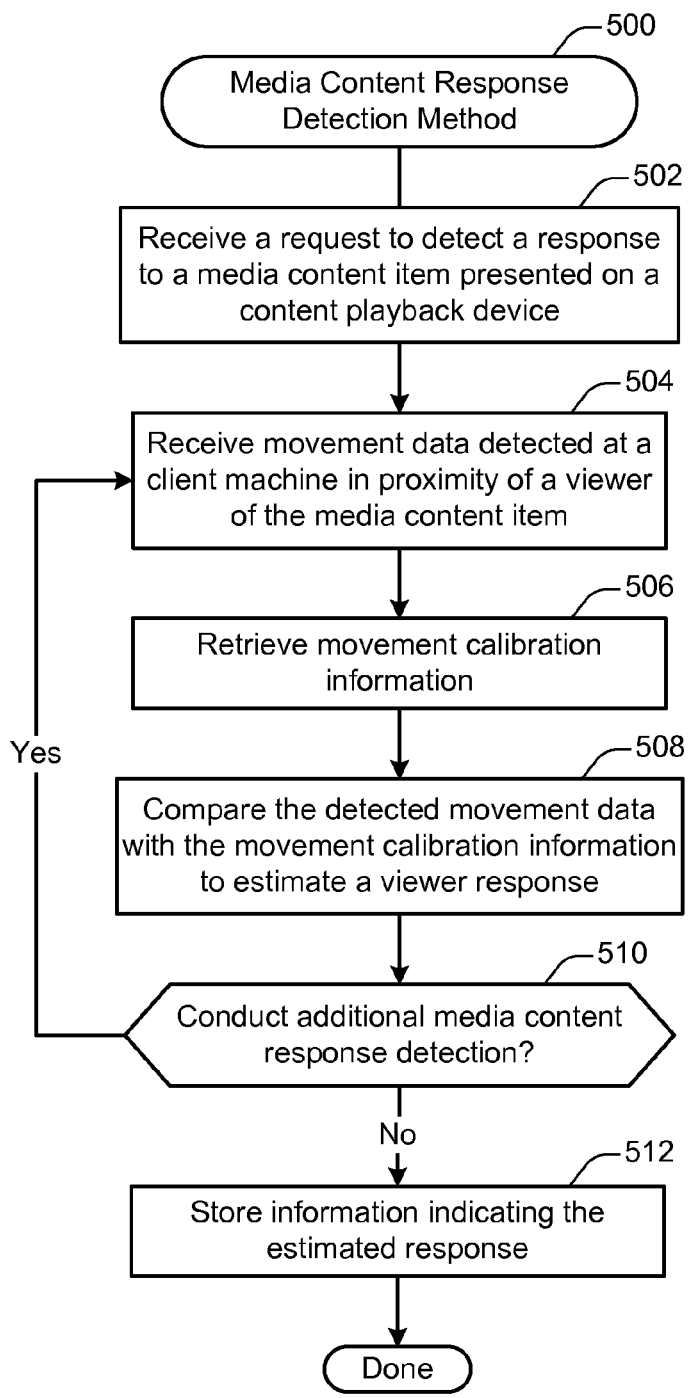
FIG. 5 illustrates one example of a method for detecting a response to media content.

In particular embodiments, the request may be generated as part of a media content response detection method, as discussed with respect to FIG. 5. For instance, movement calibration information may be determined based on analyzing and comparing movement data from a potentially large number of users. For example, the media system may receive movement data from a large number of users viewing a broadcast television channel. Around the time of a commercial break, movement data such as signal strength or accelerometer data may indicate a significant change in many viewer's relationship to a content presentation device. In this case, the timing of the commercial break may be treated as media content response information since many users tend to stand up and move away from a content presentation device such as a television during a commercial break. This media content response information may be associated with the received movement data to infer that any viewer associated with similar movement data has exhibited the response of moving away from the content presentation device.

At 404, a media content item is presented on a media content playback device. According to various embodiments, the media content item may be retrieved from any of a variety of media content sources. For example, the media content item may be streamed or downloaded from an internet content service provider such as iTunes or Netflix. As another example, the media content item may be transmitted from the media system. As yet another example, the media content item may be retrieved from a local or network storage location.

According to various embodiments, the media content item may be presented when it selected by a viewer. For instance, a viewer may select the media content item for playback from a digital content guide or from an asset overlay. In particular embodiments, the viewer may also select a media content device for presenting the media content item. For instance, the viewer may select any active media playback device associated with the content management account.

At 406, movement data is detected at a client machine in proximity of a viewer of the media content item. According to various embodiments, the client machine may be any of various devices. The client machine may be a device held by the user, may be located in the user's pocket, may be carried by the user in a bag, purse, or backpack, or may be placed on a surface near the user. In particular embodiments, the client machine may be associated with the content management account. For instance, the user may be logged in to a content management account at the media system.

According to various embodiments, movement data may include various types of information collected from the media playback device or from a client machine in proximity to the media playback device. For example, movement data may indicate a distance of the client device from the media content playback device, as measured via signal strength between the two devices. As another example, movement data may indicate acceleration, shaking, velocity, direction of movement, orientation (e.g. upside down or tilted at an angle), time of movement, or any other movement-related information.

According to various embodiments, the movement data may be detected at a client machine via any of various movement detection techniques or mechanisms. For instance, the client machine may include one or more of various types of sensors. The sensors that may be used to detect the movement data may include, but are not limited to: accelerometers, orientation sensors, signal strength sensors, optical sensors, vibration sensors, cameras, or microphones. In some cases, more than one sensor may be used to collect the movement data. For instance, a mobile phone may include two accelerometers to detect acceleration or movement in different directions.

According to various embodiments, movement data may be detected from a client machine such as the content presentation device. For instance, the viewer may be holding a tablet computer or mobile phone that is being used to present media content. The tablet computer or mobile phone may include one or more sensors such as an accelerometer, camera, signal strength detector, or microphone.

According to various embodiments, movement data may be detected from a client machine other than the media content playback device. For example, movement data may be detected from a computing device such as a mobile phone carried by the viewer as the viewer moves toward or away from a media content playback device such as a television. As another example, movement data may be detected from a computing device such as a mobile phone as the viewer sits near the media content playback device. For instance, movement data may indicate that the viewer is laughing or exhibiting some other reaction to the media content presented on the media playback device.

According to various embodiments, movement data may be measured at particular times with respect to the presentation of the media content item. For example, movement data may be measured before, during, and after a media event. As another example, movement data may be measured as it correlates to a specific event in the presentation of the media content item, including, but not limited to: punch lines, dramatic pauses, intervals, or during advertisements, or soundtrack orchestrations (e.g. dramatic swells of music prior to a fight scene or suspenseful moment).

At 408, media content response information is received from the viewer. According to various embodiments, media content response information may be collected via any of various techniques or mechanisms. For example, media content response information may be collected by analyzing media content presentation patterns. For instance, a broadcast television channel may have a commercial break during a designated time period, or a viewer may start or start viewing on-demand content at known times. As another example, media content response information may also be collected via data self-reported by viewers. For instance, upon completion of a particular episode of a comedic television program, viewers may fill out surveys reporting their responses.

In particular embodiments, media content response information may be collected via observation. For example, participants in a focus group may be observed by individuals or by audio and/or video recording equipment. As another example, some viewers may allow their responses to be observed via audio and/or video equipment such as a webcam.

At 410, movement data is associated with the media content response information to create movement calibration information. According to various embodiments, the movement data may be associated with the media content response information to link particular patterns of movement information to observed media content response information. For instance, the media content response information may indicate that the user is laughing, while the movement data includes shaking detected from an accelerometer. These two patterns may then be linked so that when shaking is detected, laughter may be inferred even in the absence of any explicit media content response information from the viewer.

According to various embodiments, certain types of movements may tend to be associated with certain types of responses. For example, rapid movement followed by jostling movement coupled with decreasing signal strength between two devices may indicate that a viewer with a mobile phone in their pocket rose from their seat and walked away from the television. As another example, shaking motion may indicate that a viewer is laughing. These associations may be analyzed for patterns, correlations, and tendencies to create movement calibration information, which may be used to estimate viewer responses based on movement data. Techniques for estimating viewer responses based on movement data are discussed in FIG. 5.

At 412, a determination is made as to whether to conduct additional media content response calibration. According to various embodiments, various criteria may be used to determine whether to conduct additional calibration. For example, calibration may continue until the media content is finished playing in its entirety. As another example, calibration may be performed at designated times during the presentation of content. For instance, media content responses may be calibrated at after punch lines are presented a comedy television program. As another example, calibration may continue until a sufficiently high quality association between movement data and media content responses has been reached. As yet another example, calibration may continue for a designated period of time, such as an hour.

At 414, the movement calibration information is stored. According to various embodiments, movement calibration information may be stored in a storage system accessible to the media system. For instance, movement calibration information may be stored in a database. Movement calibration information may be stored in such a way that it can be retrieved when performing analysis for estimating viewer responses, as discussed with respect to FIG. 5.

FIG. 5 illustrates one example of a method 500 for detecting a response to media content. According to various embodiments, the method 500 may be performed at a media system in communication with potentially many different client machines and media content playback devices. The method 500 may be used to receive and analyze movement data collected in association with the presentation of a media content item. The analysis may be used to determine, estimate, or infer viewer actions or impressions in response to the media content item based on the calibration of response detection techniques.

At 502, a request to detect a response to a media content item presented on a content playback device is received. According to various embodiments, the request may be received at a media system such as the media systems discussed with respect to FIGS. 3 and 4. The request may be received for designated media content items accessible via the media system. For instance, the request may be received when an instruction for presenting a media content item is transmitted to a content playback device in communication with the media system.

At 504, movement data detected at a client machine in proximity of a viewer of the media content item is received. According to various embodiments, the receipt of movement data in operation 504 may be substantially similar to the receipt of movement data discussed with respect to operation 404 shown in FIG. 4. In particular embodiments, the movement data may be collected at any sensor accessible to a mobile computing device possessed by a viewer of media content. Alternately, or additionally, the movement data may be collected at any computing device, such as a content playback device, in communication with such a mobile computing device.

According to various embodiments, the movement data may include any information that may allow an inference about or indication of viewer movement. For example, the movement data may include data regarding communication connection signal strength. As another example, the movement data may include data regarding device acceleration, orientation, or position.

According to various embodiments, the movement data may be collected from any of various mobile devices in communication with the media system. The mobile devices may be associated with content management accounts at the media system. The mobile devices may be in the possession of viewers of the media content. For instance, the mobile devices may include tablet computers, laptop computers, mobile phones, or other mobile devices.

According to various embodiments, the movement data may be transmitted to the media system shortly after it is detected at the mobile devices. Alternately, or additionally, the movement data may be aggregated and transmitted later. For instance, a mobile device may not be in continuous communication with the media system and may provide the movement data during the time periods when a communications connection is present.

According to various embodiments, the movement data may be collected in association with the presentation of media content that is presented at the same time to a large number of viewers. For instance, the movement data may be collected from mobile devices of viewers watching a television broadcast. Alternately, or additionally, the movement data may be collected from mobile devices of viewers watching on-demand content such as video streamed over a network such as the Internet. In particular embodiments, the movement data may be collected and aggregated for the same media content item. For instance, movement data may be collected and aggregated for a particular movie, television program, or radio program.

At 506, movement calibration information is retrieved. According to various embodiments, the movement calibration information may be determined as discussed with respect to FIG. 4. According to various embodiments, the movement calibration information may include one or more correlations, tendencies, or associations linking movement data to viewer responses. For instance, the movement calibration data may indicate that a particular type of movement data received from accelerometers or orientation sensors in mobile phones indicates that the person possessing the mobile phone has stood up and is walking away from a television.

In particular embodiments, the movement calibration information may be determined by linking movement data with information about viewer responses obtained via more intrusive techniques, such as cameras, microphones, or self-reported assessments. Alternately, or additionally, the movement calibration information may be determined by using known or anticipated information about user actions. For instance, many viewers may be expected to stand up and walk around during a commercial presented during a television program. In this case, movement data collected from many different viewers during a commercial break in a program may be aggregated and compared to determine the proportion of users who stood up and walked around rather than viewed the commercials.

At 508, the detected movement data is compared with the movement calibration information to estimate a viewer response. According to various embodiments, the comparison may be performed by determining whether the movement data fits a pattern associated with a viewer response as indicated by the movement calibration information. For instance, the movement calibration information may include a particular pattern of accelerometer data where a shaking movement is detected followed by one or more sharp jarring actions. The movement calibration information may associated with pattern with laughter followed by one or more knee slaps, indicating that the viewer possessing the mobile phone at which the accelerometer is located found the media content humorous. If the movement data includes such a pattern, then the associated response in the calibration data may be estimated or inferred.

At 510, a determination is made as to whether to conduct additional media content response detection. According to various embodiments, the determination may be made based on any of various factors. For example, media content response detection may continue to be performed until the presentation of the media content item discussed with respect to operation 502 is completed. As another example, media content response detection may continue to be performed until a clear inference as to the viewer response is detected. For instance, initially the movement data may not unambiguously identify a viewer response, but the viewer response may be clarified upon analysis of additional movement data. As yet another example, media content response detection may be performed for a designated period of time. As still another example, media content response detection may be performed upon detection of various triggering events, such as the occurrence of punch lines in a comedy show.

At 512, information indicating the estimated response is stored. According to various embodiments, the information may be stored on a storage medium accessible within the media system. The information may be used for any of various purposes, such as improving the experience of viewers of the media content and/or users of the media system.

According to various embodiments, estimated response information may be used to select content for making it available via the media system. For instance, aggregated estimated response information may indicate that users of the media system tend to walk away from the television when a particular media content item is presented. In this case, the content provider may elect to provide other content instead of the content that viewers seem to dislike.

According to various embodiments, estimated response information may be used to analyze advertising to determine its efficacy or to provide more effective advertising. For instance, aggregated estimated response information may indicate that viewers of one advertisement tend to walk away from the television screen while viewers of another advertisement tend to watch the advertisement and even find it humorous. In this case, the advertisers may infer that the second advertisement is more effective and more likely to affect viewer behavior than the first advertisement. This may allow the advertisers to better target their advertisements to a particular demographic or even produce more effective advertisements.

According to various embodiments, estimated response information may be used to provide improved media content recommendations in association with a content management account. For example, the estimated response information may indicate that viewers viewing content in association with a particular content management account tend to laugh more when presented with a particular type of comedy, such as situation comedies. In this case, these viewers may be provided with recommendations for other comedy shows that fall within the situation comedy category. For instance, these recommendations may be provided within the context of a personalized digital program guide created for the content management account.

FIG. 6 illustrates one example of a server. According to particular embodiments, a system 600 suitable for implementing particular embodiments of the present invention includes a processor 601, a memory 606, an interface 611, and a bus 615 (e.g., a PCI bus or other interconnection fabric) and operates as a streaming server. When acting under the control of appropriate software or firmware, the processor 601 is responsible for modifying and transmitting live media data to a client. Various specially configured devices can also be used in place of a processor 601 or in addition to processor 601. The interface 611 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 600 is a server that also includes a transceiver, streaming buffers, and a program guide database. The server may also be associated with subscription management, logging and report generation, and monitoring capabilities. In particular embodiments, the server can be associated with functionality for allowing operation with mobile devices such as cellular phones operating in a particular cellular network and providing subscription management capabilities. According to various embodiments, an authentication module verifies the identity of devices including mobile devices. A logging and report generation module tracks mobile device requests and associated responses. A monitor system allows an administrator to view usage patterns and system availability. According to various embodiments, the server handles requests and responses for media content related transactions while a separate streaming server provides the actual media streams.

Although a particular server is described, it should be recognized that a variety of alternative configurations are possible. For example, some modules such as a report and logging module and a monitor may not be needed on every server. Alternatively, the modules may be implemented on another device connected to the server. In another example, the server may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method comprising:
receiving first movement data transmitted from a mobile phone including a processor and memory, the first movement data being associated with a presentation of an on-demand video content item at a television in association with a content management account, the content management account associating user preference information with on-demand video content, the first movement data indicating a movement of the mobile phone through space;
comparing the first movement data with movement calibration information to create media content response data, the movement calibration information correlating second movement data with a plurality of user responses to the presented on-demand video content item, the second movement data received from a first plurality of mobile phones, the movement calibration information being determined by comparing the second movement data with media content timing information that describes when the on-demand video content item was presented at a second plurality of client machines, the media content response data indicating one or more of the plurality of user responses; and
storing the media content response data on a storage medium.

2. The method recited in claim 1, wherein the second client machine is operable to wirelessly communicate with the mobile phone.

3. The method recited in claim 2, wherein the first movement data comprises signal strength data indicating a strength of a wireless connection between the mobile phone and the television.

4. The method recited in claim 1, wherein the first movement data is detected at a sensor located at the mobile phone.

5. The method recited in claim 1, wherein the second movement data indicates respective movements of the first plurality of mobile phones through space.

6. The method recited in claim 1, wherein the first movement data comprises acceleration data representing an acceleration of the mobile phone.

7. The method recited in claim 1, wherein the first movement data comprises location data indicating a location of the mobile phone.

8. The method recited in claim 1, wherein the first movement data comprises spatial orientation data indicating a spatial orientation of the mobile phone.

9. A system comprising:
a communications interface operable to receive first movement data transmitted from a mobile phone including a processor and memory, the first movement data being associated with a presentation of an on-demand video content item at a television in association with a content management account, the content management account associating user preference information with on-demand video content, the first movement data indicating a movement of the mobile phone through space;
a system processor operable to compare the first movement data with movement calibration information to create media content response data, the movement calibration information correlating second movement data with a plurality of user responses to the presented on-demand video content item, the second movement data received from a first plurality of client machines, the movement calibration information being determined by comparing the second movement data with media content timing information that describes when the on-demand video content item was presented at a second plurality of client machines, the media content response data indicating one or more of the plurality of user responses; and
a storage medium operable to store the media content response data.

10. The system recited in claim 9, wherein the second client machine is operable to wirelessly communicate with the mobile phone.

11. The system recited in claim 10, wherein the first movement data comprises signal strength data indicating a strength of a wireless connection between the mobile phone and the television.

12. The system recited in claim 9, wherein the first movement data is detected at a sensor located at the mobile phone.

13. The system recited in claim 9, wherein the second movement data indicates respective movements of the first plurality of mobile phones through space.

14. The system recited in claim 9, wherein the first movement data comprises acceleration data representing an acceleration of the mobile phone.

15. The system recited in claim 9, wherein the first movement data comprises location data indicating a location of the mobile phone.

16. The system recited in claim 9, wherein the first movement data comprises spatial orientation data indicating a spatial orientation of the first client machine mobile phone.

17. One or more non-transitory computer readable media having instructions stored thereon for performing a method, the method comprising:
receiving first movement data transmitted from a mobile phone including a processor and memory, the first movement data being associated with a presentation of an on-demand video content item at a television in association with a content management account, the content management account associating user preference information with on-demand video content, the first movement data indicating a movement of the mobile phone through space;
comparing the first movement data with movement calibration information to create media content response data, the movement calibration information correlating second movement data with a plurality of user responses to the presented on-demand video content item, the second movement data received from a first plurality of client machines, the movement calibration information being determined by comparing the second movement data with media content timing information that describes when the on-demand video content item was presented at a second plurality of client machines, the media content response data indicating one or more of the plurality of user responses; and
storing the media content response data on a storage medium.

18. The one or more non-transitory computer readable media recited in claim 17, wherein the second client machine is operable to wirelessly communicate with the mobile phone.

19. The one or more non-transitory computer readable media recited in claim 18, wherein the first movement data comprises signal strength data indicating a strength of a wireless connection between the mobile phone and the television.

20. The one or more non-transitory computer readable media recited in claim 17, wherein the first movement data is detected at a sensor located at the mobile phone.

* * * * *